United States Patent
Jabs et al.

(10) Patent No.: US 8,534,425 B2
(45) Date of Patent: Sep. 17, 2013

(54) METHOD FOR REGULATING THE LEVEL OF A SECTION OF AN OIL TRAY COMPRISING AT LEAST TWO SECTIONS

(75) Inventors: Svenin Jabs, Weingarten (DE); Martin Gluck, Brandenburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 546 days.

(21) Appl. No.: 12/442,420

(22) PCT Filed: Sep. 3, 2007

(86) PCT No.: PCT/EP2007/059182
§ 371 (c)(1), (2), (4) Date: Mar. 23, 2009

(87) PCT Pub. No.: WO2008/037566
PCT Pub. Date: Apr. 3, 2008

(65) Prior Publication Data
US 2009/0314580 A1 Dec. 24, 2009

(30) Foreign Application Priority Data

Sep. 26, 2006 (DE) .................. 10 2006 045 240

(51) Int. Cl.
*F16N 7/26* (2006.01)
(52) U.S. Cl.
USPC ....................................... 184/11.1
(58) Field of Classification Search
USPC .................. 184/11.1, 6.12, 106; 123/195 C, 123/196 R
See application file for complete search history.

(56) References Cited

U.S. PATENT DOCUMENTS

| | | | | |
|---|---|---|---|---|
| 1,554,081 A | * | 9/1925 | Garrett | 184/6.12 |
| 3,529,698 A | * | 9/1970 | Nelson | 184/6.12 |
| 4,270,497 A | * | 6/1981 | Valerio | 123/195 C |
| 4,721,184 A | * | 1/1988 | Sowards | 184/6.12 |
| 4,745,816 A | * | 5/1988 | Horiuchi et al. | 74/467 |
| 4,938,184 A | * | 7/1990 | Martin et al. | 123/195 C |
| 4,986,235 A | * | 1/1991 | Ishii et al. | 123/195 C |
| 6,299,561 B1 | * | 10/2001 | Kramer et al. | 475/160 |
| 6,340,012 B1 | * | 1/2002 | Yamashita et al. | 123/195 C |
| 6,374,951 B1 | | 4/2002 | Michelhaugh et al. | |
| 6,616,432 B2 | * | 9/2003 | Szczepanski et al. | 418/126 |
| 6,644,439 B2 | | 11/2003 | Schnitzer | |
| 7,213,682 B2 | * | 5/2007 | Gibson et al. | 184/6.12 |
| 2004/0144597 A1 | | 7/2004 | Meteleus et al. | |
| 2006/0063633 A1 | | 3/2006 | Turner et al. | |

FOREIGN PATENT DOCUMENTS

| | | |
|---|---|---|
| DE | 1047820 | 12/1958 |
| DE | 1801917 | 5/1970 |
| DE | 4321655 A1 | 1/1995 |
| DE | 10032510 A1 | 2/2001 |
| DE | 10034561 A1 | 2/2001 |
| DE | 10051356 A1 | 4/2002 |
| DE | 10223927 A1 | 7/2003 |
| DE | 10260354 A1 | 7/2003 |
| DE | 10 2004 004 079 A1 | 8/2004 |

(Continued)

*Primary Examiner* — William A Rivera
*Assistant Examiner* — Michael Riegelman
(74) *Attorney, Agent, or Firm* — Davis & Bujold, PLLC

(57) ABSTRACT

A method of regulating the oil level in a section of an oil sump of a splash-lubricated transmission that has at least first and second oil sump sections that are separated by a baffle plate (2). The oil sprayed from a gearwheel (1), that is immersed in one oil sump section, is specifically deflected into an adjacent oil sump section.

12 Claims, 1 Drawing Sheet

(56) References Cited

FOREIGN PATENT DOCUMENTS

| | | |
|---|---|---|
| EP | 1128095 A1 | 8/2001 |
| EP | 1452778 A2 | 9/2004 |
| FR | 2744508 A1 | 8/1997 |
| GB | 222863 | 7/1923 |
| GB | 2103301 A | 2/1983 |
| WO | 2005/059409 A1 | 6/2005 |

* cited by examiner

METHOD FOR REGULATING THE LEVEL OF A SECTION OF AN OIL TRAY COMPRISING AT LEAST TWO SECTIONS

This application is a National Stage completion of PCT/EP2007/059182 filed Sep. 3, 2007, which claims priority from German patent application serial no. 10 2006 045 240.2 filed Sep. 26, 2006.

FIELD OF THE INVENTION

The present invention concerns a method for regulating the oil level in a section of an oil sump of a splash-lubricated transmission that comprises at least two oil sump sections. In addition, the invention concerns a device for regulating the oil level in a section of an oil sump of a splash-lubricated transmission that comprises at least two oil sump sections, and in particular a device for implementing the method according to the invention.

BACKGROUND OF THE INVENTION

Within a splash-lubricated transmission, in particular a transmission of step-down design, the various diameters of the gearwheels involved result in varying immersion levels of the gearwheels in the oil sump. If a pair of engaging gears is not immersed in the oil sump, or only insufficiently so, then adequate lubrication and cooling in the tooth engagement area is not ensured and, disadvantageously, this deficient lubrication results in premature wear of the running gearteeth.

From the prior art it is known, in order to raise or lower the oil level specifically in particular sections of the oil sump, to use baffle plates to produce individual oil sump sections in which the oil level can be raised or lowered for example by virtue of the housing wall or by means of grooves, but this solution, disadvantageously, entails additional costs.

SUMMARY OF THE INVENTION

The purpose of the present invention is to indicate a method for regulating the oil level in a section of an oil sump of a splash-lubricated transmission that comprises at least two oil sump sections, which ensures adequate lubrication and cooling of the gearwheels of the transmission. In addition, a device for regulating the oil level in a section of an oil sump that comprises at least two oil sump sections is provided, which is suitable for implementing the method according to the invention.

Accordingly, to regulate the oil level in a section of an oil sump comprising at least two oil sump sections, it is proposed that the oil splashing off a gearwheel immersed in one section of the oil sump is specifically deflected into another oil sump section. According to the invention the oil splashing off a gearwheel immersed in the sump is deflected into an adjacent oil sump section, these two sections being separated by a baffle plate, the oil passing through the baffle plate via an opening located above the desired oil level.

To deflect the splashing oil a deflector device is provided, preferably arranged directly on the baffle plate under the gearwheel from which the oil is coming. Oil is drawn out of the sump by the rotating gearwheel and flung off radially. It is then deflected upward and to the side by the deflector device, which is preferably formed as a bowl, so that the oil passes through the opening in the baffle plate to the back of the latter. The deflector device can also be made in some other suitable form.

Thanks to the concept according to the invention sufficient lubrication and cooling of the gearwheels of a splash-lubricated transmission is ensured in a simple and inexpensive manner.

BRIEF DESCRIPTION OF DRAWINGS

Below, an example embodiment of the invention is explained in more detail with reference to the attached figures, which show.

DETAILED DESCRIPTION OF THE PREFERRED EMBODIMENTS

Figure 1:
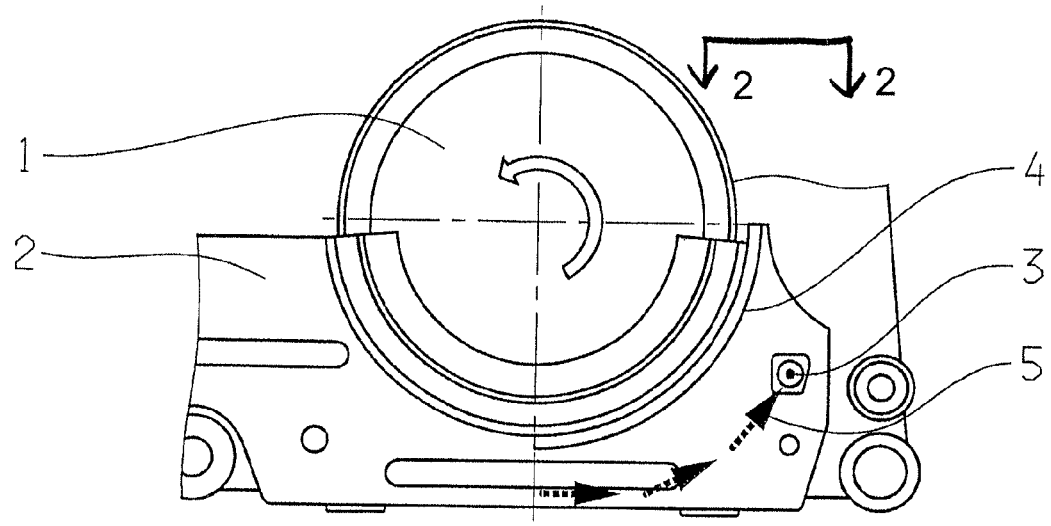
FIG. 1: Schematic front view of the device according to the invention for regulating the oil level in a section of an oil sump that comprises at least two oil sump sections.
Figure 2:
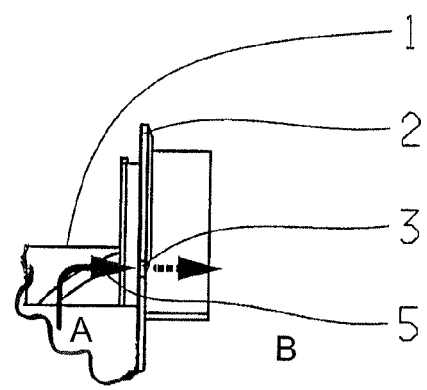
FIG. 2: A partial schematic side view of the device according to the invention, along a section line 2-2 of in FIG. 1, for regulating the oil level in a section of an oil sump that comprises at least two oil sump sections.

FIGS. 1 and 2 show a gearwheel 1 which rotates in the direction indicated by the arrow in a first oil sump section A of a splash-lubricating oil sump, the first oil sump section A being separated from a second oil sump section B by a baffle plate 2. According to the invention, an opening 3 is provided in the baffle plate 2 above the oil level desired in the second, adjacent oil sump section B, through which the splashed oil is deflected into the second oil sump section B.

A preferably curved deflector device 4 is provided to deflect the splashed oil, and is positioned directly on the baffle plate 2 under the gearwheel1 from which the oil is coming. Oil is drawn out of the first oil sump A by the gearwheel, directed radially, and deflected by the deflector device 4 upward and to the side so that it passes through the opening 3, to the back of the baffle plate 2 and into the adjacent second oil sump section B where, as shown in FIG. 2, the oil is accommodated and maintained in the second sump section B at a higher oil level than the oil level in the first oil sump section A. The direction of movement of the oil is indicated in the figures by the arrows 5.

INDEXES

1 Gearwheel
2 Baffle plate
3 Opening
4 Deflector device
5 Oil movement direction
A First Oil Sump
B Second Oil Sump

The invention claimed is:

1. A splash-lubricated transmission having an oil sump with at least first and second oil sump sections (A, B) both lying in a horizontal plane, the first oil sump section (A) being separated from the second oil sump section (B) by a baffle plate (2) that extends vertically and separates the first and second oil sump sections (A, B) from one another, and a rotating gearwheel (1) being arranged in the first oil sump section (B), a vertical surface of the baffle plate (2) having an opening (3) above an oil level desired in the second oil sump section (B) so that, during rotation of the gearwheel (1), the oil flows into the second oil sump section (B), and a deflector device (4) being provided in the first oil sump section (A) to deflect oil flung off radially from the gearwheel (1) to a side, through the opening (3) in the baffle plate (2) and into the second oil sump section (B).

2. The transmission according to claim 1, wherein the deflector device (4) for the splashed oil is arranged directly on the baffle plate (2) under the gearwheel (1) from which the oil is coming.

3. The transmission according to claim 2, wherein the deflector device (4) is in the form of a bowl.

4. A splash-lubricated transmission comprising:
   an oil sump having at least a first oil sump section (A) and a second oil sump section B which lie in a horizontal plane and are separated from one another by a baffle plate (2) that extends vertically within the oil sump to accommodate oil at a desired level in the second oil sump section (B), and a vertically elongate portion of the baffle plate (2) having an opening (3), which defines a vertical plane, that is located vertical above the desired level of oil in the second oil sump section (B);
   a rotating gear wheel (1) being immersed in oil that is accommodated within the first oil sump section (A) and defining a rotational axis extending normal to the baffle plate (2); and
   a deflector device (4) being located within the first oil sump section (A) to divert oil, that is propelled radially by the rotating gear wheel (1) against the deflector device (4), laterally through the opening (3) in the baffle plate (2) and into the second oil sump section (B) so that, during rotation of the gearwheel (1), the oil flows into the second oil sump section (B).

5. The transmission according to claim 4, wherein the deflector device (4) is located on the baffle plate (2) under the gear wheel (1) from which the oil is radially propelled.

6. The transmission according to claim 5, wherein the deflector device (4) has the shape of a bowl.

7. The transmission according to claim 4, wherein the opening (3) is located adjacent a connection between the deflector device (4) and the baffle plate (2).

8. The transmission according to claim 4, wherein the opening (3) is a round aperture which is smaller in both height and width than the gearwheel (1).

9. The transmission according to claim 4, wherein the opening (3) is a round aperture which has maximum dimension which is less than one half a maximum dimension of the gearwheel (1).

10. The transmission according to claim 4, wherein the opening (3) in the baffle plate (2) is above both an oil level desired in the first oil sump section (A) and the oil level desired in the second oil sump section (B).

11. The transmission according to claim 4, wherein the oil only communicates with the opening (3) in the baffle plate (2) during rotation of the gearwheel (1).

12. A method of regulating an oil level in an oil sump section of a transmission having an oil sump with at least a first oil sump section (A) and a second oil sump section B both lying in a horizontal plane, the first oil sump section (A) being separated from the second oil sump section (B) by a baffle plate (2) that extends vertically and separates the first and second oil sump sections (A, B) from one another, and a rotating gearwheel (1) being arranged in the first oil sump section (A), a vertically elongate surface of the baffle plate (2) having an opening (3), which defines a vertical plane, located vertically above an oil level desired in the second oil sump section (B) so that, during rotation of the gearwheel (1), the oil flows into the second oil sump section (B) via the opening (3), and a deflector device (4) being provided in the first oil sump section (A) to deflect oil flung off radially from the gearwheel (1) through the opening (3) in the baffle plate (2) and into the second oil sump section (B), the method comprising the steps of:
    directing the oil flung off the gearwheel (1) immersed in the first oil sump section (A) against the deflector device (4); and
    diverting the oil flung against the deflector device (4) laterally through the opening (3) in the baffle plate (2) and into the second oil sump section (B).

* * * * *